(12) United States Patent
Kwon et al.

(10) Patent No.: US 11,437,860 B2
(45) Date of Patent: Sep. 6, 2022

(54) WIRELESS CHARGING DEVICE USING MULTI-COIL

(71) Applicant: LG ELECTRONICS INC., Seoul (KR)

(72) Inventors: Jaesoon Kwon, Seoul (KR); Hwanyong Kim, Seoul (KR); Beom Seok Chae, Seoul (KR); Sooyong Park, Seoul (KR); Seong Hun Lee, Seoul (KR); Eunsoo Lee, Seoul (KR); Hyengcheul Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 384 days.

(21) Appl. No.: 16/727,040

(22) Filed: Dec. 26, 2019

(65) Prior Publication Data

US 2020/0212722 A1    Jul. 2, 2020

(30) Foreign Application Priority Data

Dec. 28, 2018 (KR) .......................... 10-2018-0172180

(51) Int. Cl.
*H02J 50/00* (2016.01)
*H02J 50/40* (2016.01)
*H02J 50/90* (2016.01)
*H01F 27/32* (2006.01)
*H01F 38/14* (2006.01)
*H02J 7/02* (2016.01)

(52) U.S. Cl.
CPC .......... *H02J 50/402* (2020.01); *H01F 27/323* (2013.01); *H01F 38/14* (2013.01); *H02J 7/02* (2013.01); *H02J 50/90* (2016.02)

(58) Field of Classification Search
CPC .......... H02J 50/402; H02J 50/10; H02J 50/90; H02J 7/02; H01F 27/323; H01F 38/14; H04B 5/0037; H04B 5/0087
See application file for complete search history.

(56) References Cited

U.S. PATENT DOCUMENTS

| | | | | |
|---|---|---|---|---|
| 3,549,825 A | * | 12/1970 | Trimble | G11B 5/3179 335/282 |
| 8,169,185 B2 | * | 5/2012 | Partovi | H01F 27/366 320/108 |
| 9,106,083 B2 | * | 8/2015 | Partovi | H02J 7/00 |
| 10,644,754 B2 | * | 5/2020 | Qiu | H02J 7/025 |

(Continued)

FOREIGN PATENT DOCUMENTS

| | | | | |
|---|---|---|---|---|
| CN | 104376955 A | * | 2/2015 | |
| CN | 208489698 U | * | 2/2019 | H02J 50/10 |

(Continued)

*Primary Examiner* — Naum Levin
(74) *Attorney, Agent, or Firm* — Birch, Stewart, Kolasch & Birch, LLP

(57) ABSTRACT

The present disclosure provides a wireless charging device in which multiple coils are overlapped with one another on separated cores. According to an embodiment of the present disclosure, the wireless charging device includes two flat cores spaced apart from each other, and a first layer coil to a fourth layer coil disposed above the two plate cores and disposed on different layers from one another and overlapped with one another, so that the multiple cores are overlapped with one another on the separated cores.

20 Claims, 10 Drawing Sheets

(56) References Cited

U.S. PATENT DOCUMENTS

| | | | |
|---|---|---|---|
| 11,201,500 B2 * | 12/2021 | Partovi | H02J 7/025 |
| 11,271,436 B2 * | 3/2022 | Kim | H02J 50/80 |
| 2016/0020639 A1 | 1/2016 | Pudipeddi et al. | |
| 2018/0090956 A1 | 3/2018 | Graham et al. | |
| 2018/0090991 A1 * | 3/2018 | Joi | H02J 50/10 |
| 2018/0269716 A1 | 9/2018 | Jang et al. | |

FOREIGN PATENT DOCUMENTS

| | | | |
|---|---|---|---|
| JP | 2012244840 A | * | 12/2012 |
| JP | 7043749 B2 | * | 3/2022 |
| KR | 10-0976163 B1 | | 8/2010 |
| KR | 10-1513631 B1 | | 4/2015 |
| KR | 10-2017-0054708 A | | 5/2017 |
| KR | 10-1745735 B1 | | 6/2017 |
| KR | 10-1777101 B1 | | 9/2017 |

\* cited by examiner

WIRELESS CHARGING DEVICE USING MULTI-COIL

CROSS-REFERENCE TO RELATED APPLICATION

The present disclosure claims priority to and the benefit of Korean Patent Application No. 10-2018-0172180, filed on Dec. 28, 2018, the disclosure of which is incorporated herein by reference in its entirety.

BACKGROUND

1. Field of the Invention

The present disclosure relates to a wireless charging device comprising multiple coils overlapped with one another on separated cores.

2. Description of Related Art

Batteries can receive power from external chargers and can store the power, and can supply the stored power as a power source to operate electronic devices.

One of the methods for charging batteries can include a method for supplying terminals. The method for supplying the terminals can include receiving commercial power and converting the commercial power into voltage and current suitable for batteries, and supplying power to batteries through charging terminals of the batteries.

However, such a method for supplying the terminals can cause a momentary discharge phenomenon, sparks, fire due to a potential difference between charging terminals of the batteries and power supply terminals of commercial power sources. Accordingly, wireless charging methods using wireless power transmission have been proposed.

Wireless charging methods can be performed by non-contact power transmitting devices and non-contact power receiving devices. In the wireless charging methods, power can be transferred from the non-contact power transmitting device to the non-contact power receiving device through an electromagnetic induction phenomenon between the two devices.

However, through the wireless charging method, one non-contact power transmitting device can supply power only to a single non-contact power receiving device, and the non-contact power receiving device can be placed at a particular position of the non-contact power transmitting device for magnetic coupling between the non-contact power transmitting device and the non-contact power receiving device, thereby having a very narrow chargeable physical range.

In order to address the latter problem, the related art document (Korean Patent No. 10-0976163) proposes a technique for extending a chargeable range.

According to this related art document, in order to supply power stably even when the non-contact power receiving device moves partially on the non-contact power transmitting device, a primary core provided in the non-contact power transmitting device can include two different types of cores, and the two cores are partially overlap with each other, to form a multi-layer structure.

However, according to the above-described related art document, magnetic field interference may occur due to overlapped cores, and power may not be simultaneously supplied to a plurality of non-contact power receiving devices.

SUMMARY OF THE INVENTION

The present disclosure provides a wireless charging device in which multiple coils are overlapped with one another on separated cores.

The present disclosure also provides a wireless charging device that can provide a wide charging area to charge battery devices.

The present disclosure further provides a wireless charging device capable of performing multiple-wireless charging for a plurality of battery devices.

The objects of the present disclosure are not limited to the above-mentioned objects, and other objects and advantages of the present disclosure which are not mentioned can be understood by the following description and more clearly understood by the embodiments of the present disclosure. It will also be readily apparent that the objects and the advantages of the present disclosure can be implemented by features described in claims and a combination thereof.

According to the present disclosure, a wireless charging device can include two plate cores spaced apart from each other, and a first layer coil to a fourth layer coil that are placed above the two plate cores, placed on different layers from one another, and are overlapped with one another.

Further, according to the present disclosure, a plurality of coils are disposed above the two plate cores and are widely overlapped with one another in a horizontal direction and a vertical direction, thereby providing a wide charging area in which battery devices are charged.

Further, according to the present disclosure, in some cases, where the plurality of battery devices are each located above a plurality of plate cores, power can be supplied to the battery device through coils disposed on plate cores, thereby performing multiple-wireless charging with respect to the plurality of battery devices.

According to the present disclosure, multiple coils are overlapped with one another on separate cores, thereby preventing magnetic fields generated by one core from being interfering with other cores, and performing the wireless power transmission using an electromagnetic induction phenomenon over a wide range.

Further, according to the present disclosure, the wide charging area can be provided to charge battery devices, so that battery devices can be charged without precisely placing, by the user, the battery device onto the wireless charging device, thereby improving user convenience.

Further, according to the present disclosure, the multiple-wireless charging can be performed with respect to the plurality of battery devices, so that a single user can simultaneously charge the plurality of battery devices or a plurality of users can simultaneously charge battery devices of users, thereby improving efficiency in using devices.

Various advantages and specific effects of the present disclosure, further to the above-mentioned effects and advantages, are described together while describing specific matters to implement the present disclosure.

BRIEF DESCRIPTION OF THE DRAWINGS

FIG. 7 is a side view taken along line A-A' shown in FIG. 4, viewed from a direction of arrow a.

DETAILED DESCRIPTION OF EXEMPLARY EMBODIMENTS

Figure 1:
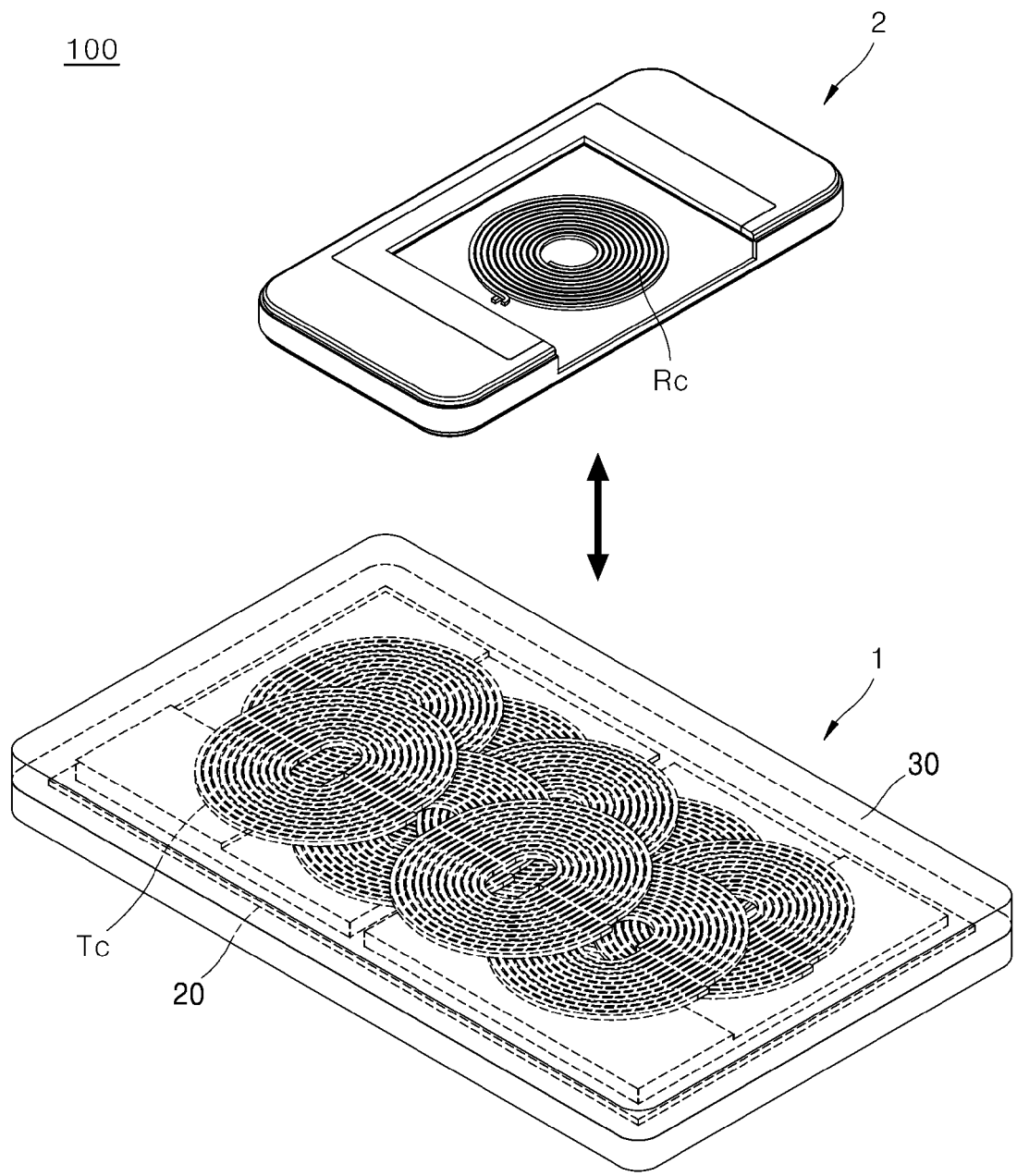
FIG. 1 shows an exemplary wireless charging system including a wireless charging device.

The above-mentioned objects, features, and advantages of the present disclosure are described in detail with reference to the accompanying drawings. Accordingly, the skilled person in the art to which the present disclosure pertains can easily implement the technical idea of the present disclosure. In the description of the present disclosure, if it is determined that a detailed description of a well-known relevant technology of the present disclosure can unnecessarily obscure the gist of the present disclosure, the detailed description thereof is omitted. One or more embodiments of the present disclosure are described in detail with reference to the accompanying drawings. In the drawings, same reference numerals are used to refer to same or similar components.

It will be understood that, although the terms "first", "second", and the like can be used herein to describe various components, however, these components should not be limited by these terms. These terms are only used to distinguish one component from another component. Thus, a first component can be a second component unless otherwise stated.

Hereinafter, when any component is arranged in "an upper portion (or a lower portion)" of the component or "on (or under")" of the component, any component can be arranged in contact with an upper surface (or a lower surface) of the component, and another component can be interposed between the component and any component arranged on (or under) the component.

Further, when one component is described as being "connected", "coupled", or "connected" to another component, the component can be directly connected or able to be connected to the other component; however, it is also to be understood that an additional component can be "interposed" between the two components, or the two components can be "connected", "coupled" or "connected" through an additional component.

Unless otherwise stated, each component can be singular or plural throughout the disclosure.

As used herein, the singular forms "a," "an" and "the" are intended to include the plural forms as well, unless the context clearly indicates otherwise. In the present disclosure, it should not be construed that terms such as "including" or "comprising" necessarily include various types of components or various steps described in the present disclosure, and it should be construed terms such as "including" or "comprising" do not include some components or some steps or can include additional components or steps.

In the present disclosure, unless otherwise stated, "A and/or B" means A, B or A and B. Unless otherwise stated, "C to D" means "C or more and D or less".

The present disclosure relates to a wireless charging device in which multiple coils are overlapped with one another on separated cores.

A wireless charging device according to an embodiment of the present disclosure is described below in detail with reference to FIGS. 1 to 10. All the components of the wireless charging devices according to all embodiments of the present disclosure are operatively coupled and configured.

FIG. 1 shows an exemplary wireless charging system including a wireless charging device.

Figure 2:
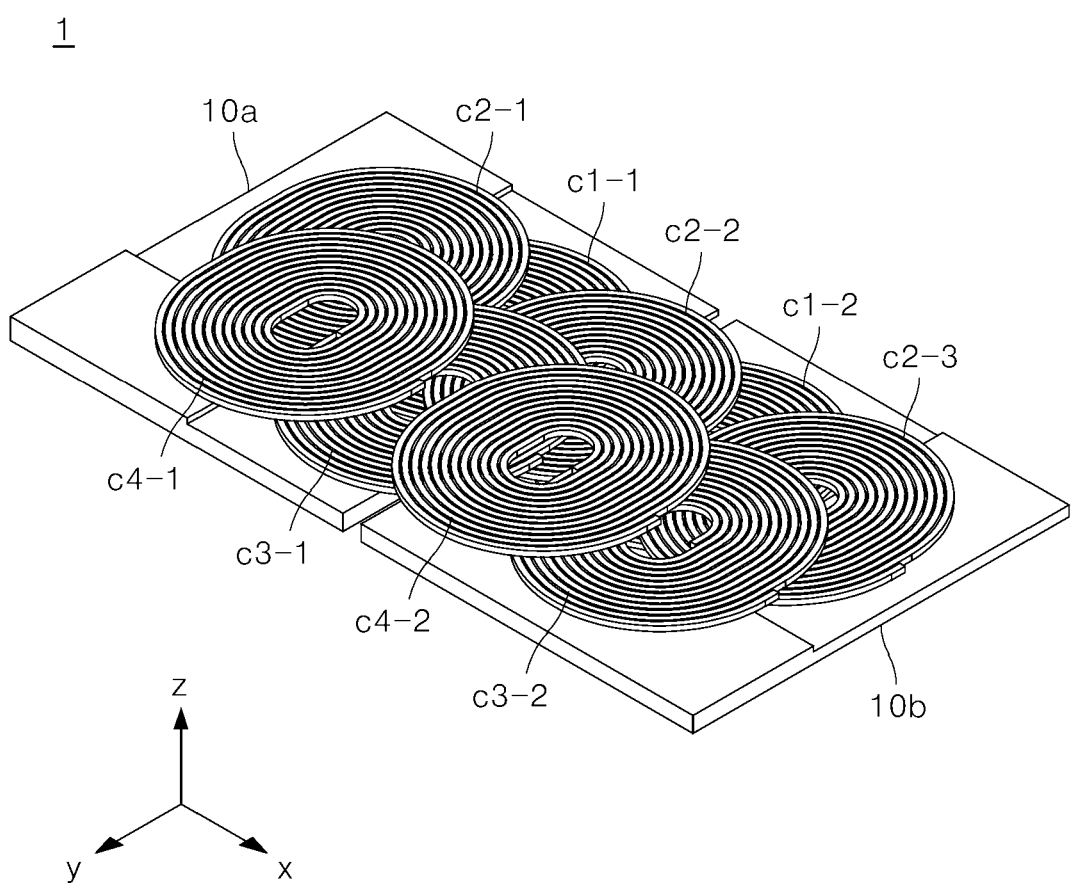
FIG. 2 shows an internal structure of the wireless charging device in FIG. 1.
Figure 3:
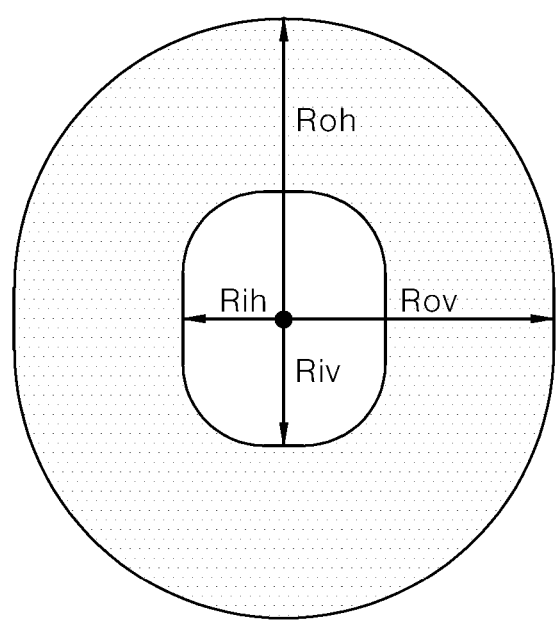
FIG. 3 additionally shows a unit coil in FIG. 2.
Figure 4:
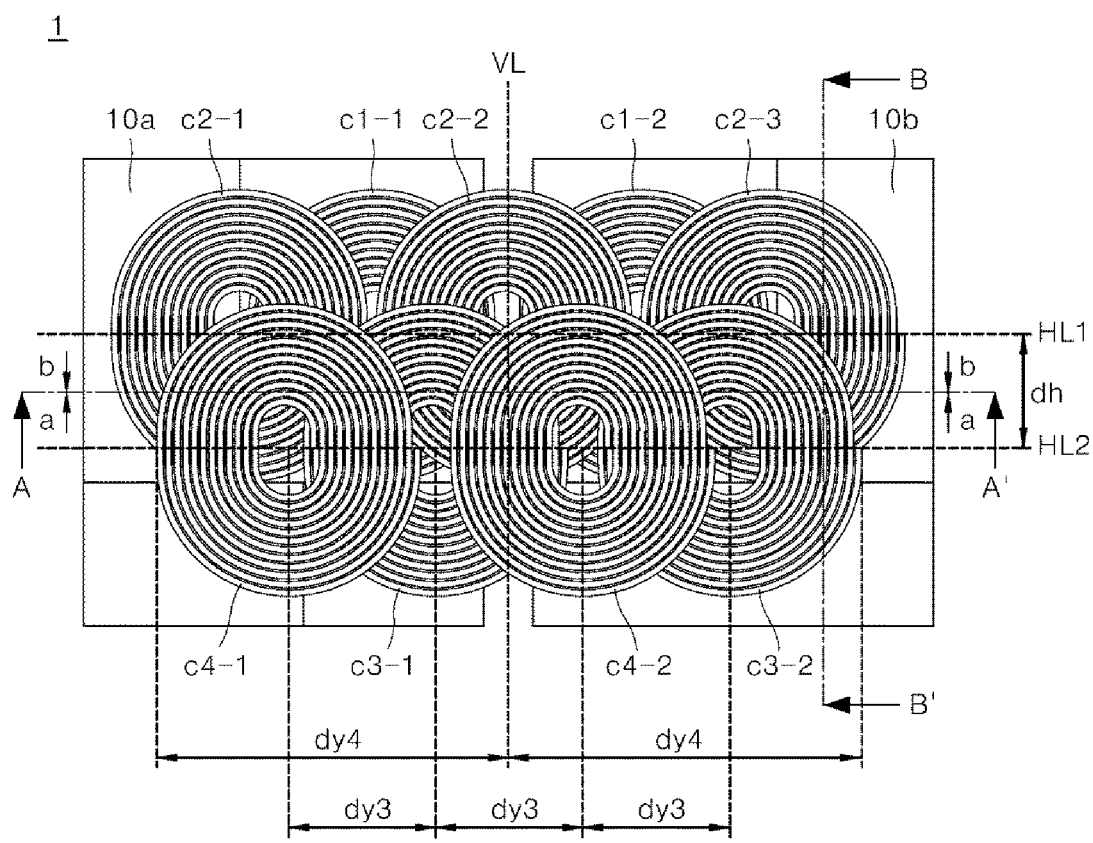
FIG. 4 is a top view showing the wireless charging device in FIG. 2.

FIG. 2 shows an internal structure of the wireless charging device in FIG. 1. FIG. 3 additionally shows a unit coil in FIG. 2. FIG. 4 is a top view showing the wireless charging device in FIG. 2.

Figure 5:
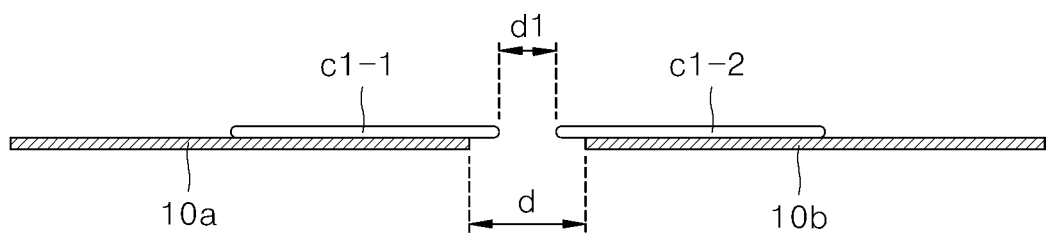
FIG. 5 is a side view additionally showing only plate cores and a first layer coil in FIG. 4.
Figure 6:
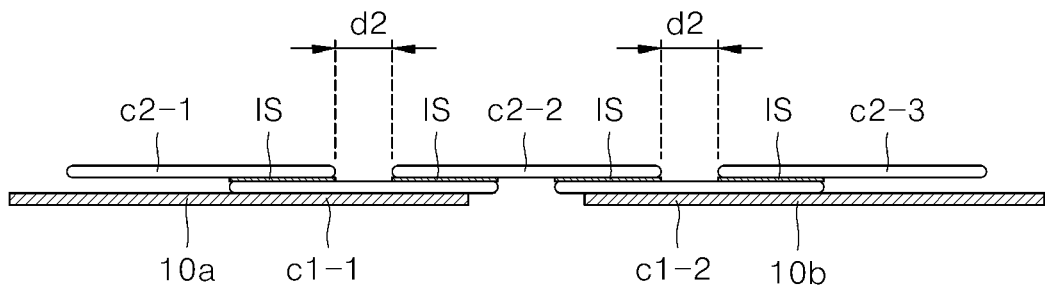
FIG. 6 is a side view additionally showing only plate cores and a first layer coil and a second layer coil in FIG. 4.

FIG. 5 is a side view additionally showing only plate cores and a first layer coil in FIG. 4. FIG. 6 is a side view additionally showing only plate cores and a first layer coil and a second layer coil in FIG. 4.

Figure 7:
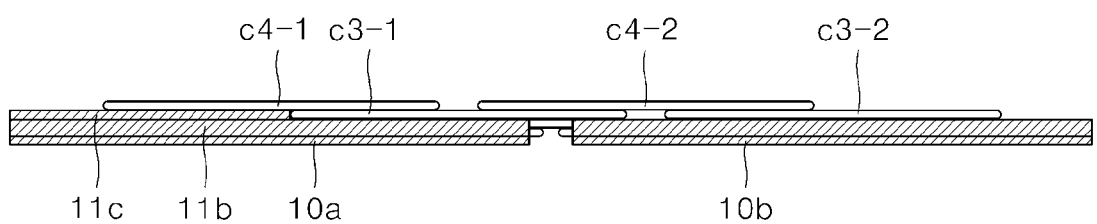
Figure 8:
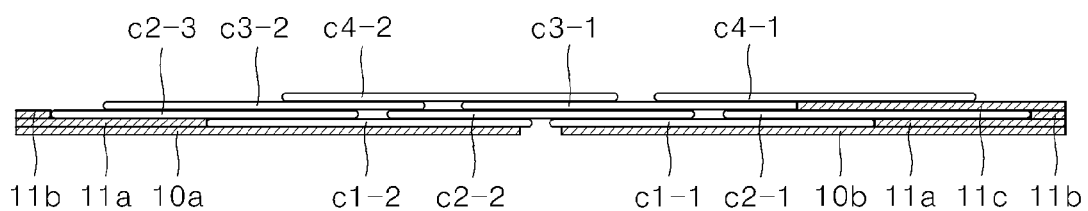
FIG. 8 is a side view taken along line A-A' shown in FIG. 4, viewed from a direction of arrow b.
Figure 9:
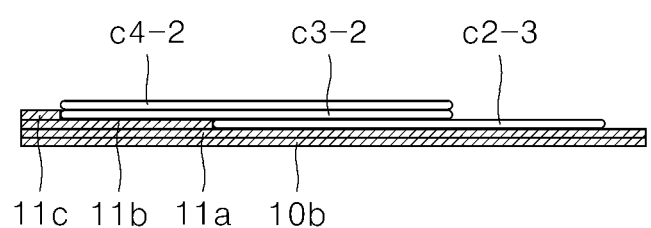
FIG. 9 is a side view taken along line B-B' shown in FIG. 4, viewed in a direction of an arrow.

FIG. 7 is a side view taken along line A-A' shown in FIG. 4, viewed from a direction of arrow a. FIG. 8 is a side view of A-A' shown in FIG. 4, viewed from a direction of arrow b. FIG. 9 is a side view taken along line B-B' shown in FIG. 4, viewed from a direction of an arrow.

Figure 10:
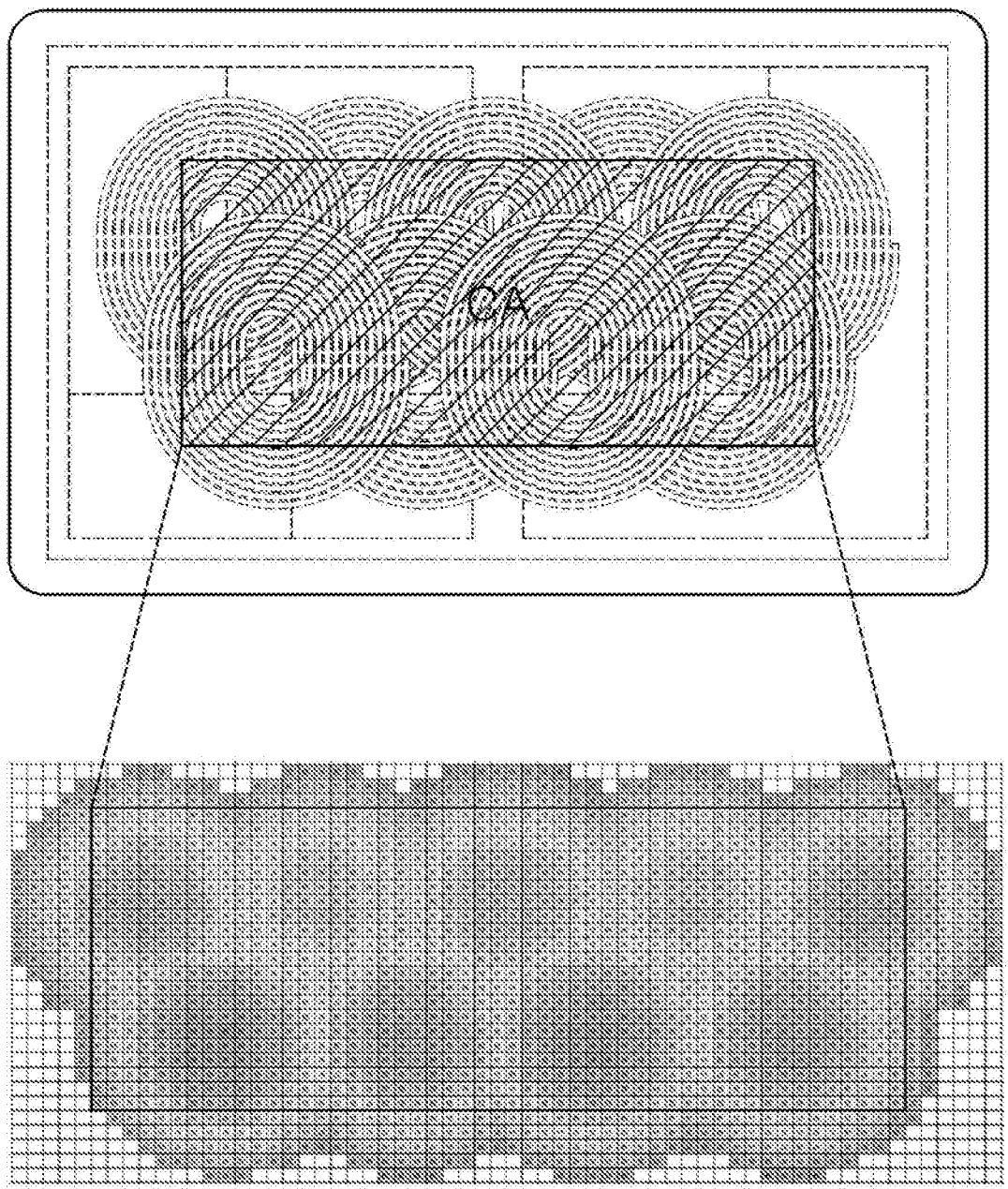
FIG. 10 shows power transmission efficiency in a charging area formed on a wireless charging device according to the present disclosure.

FIG. 10 shows exemplary power transmission efficiency in a charging area formed on a wireless charging device.

Referring to FIG. 1, a wireless charging system 100 can include a wireless charging device 1 that supplies power wirelessly based on an external power source, and a battery device 2 that receives power supplied by the wireless charging device 1.

To this end, the wireless charging device 1 can be connected to an external power source, and can include a plate core and a plurality of transmitting coils Tcs that are disposed above the plate cores and are overlapped with one another. The external power source can include any voltage source to supply a voltage having a predetermined magnitude, and can be, for example, a commercial alternating current (AC) power source used at home. In order to connect with the external power source, the wireless charging device 1 can further include an additional cable.

Meanwhile, the battery device 2 can include a receiving coil Rc, a battery, and a micro controller unit (MCU) that controls the receiving coil Rc and the battery, and can be, for example, a mobile device such as a smart phone, a tablet, a wearable electronic device like a smart watch, a smart eye wear and a fitness monitor, etc.

The wireless charging device 1 can supply power to the battery device 2 using an electromagnetic induction phenomenon between the transmitting coil Tc and a receiving coil Rc, and the battery device 2 can receive the power from the wireless charging device 1 to charge the battery.

In some examples, the battery device 2 is placed on or is close to the wireless charging device 1 so that the receiving coil Rc in the battery device 2 and the transmitting coil Rc in the wireless charging device 1 are located within a predetermined distance.

In some cases, where the wireless charging device 1 applying a current to the transmitting coil Tc based on an external power source, magnetic coupling can be performed between the transmitting coil Tc and the receiving coil Rc. In other words, based on a current flowing through the transmitting coil Tc, a magnetic field can be generated in the transmitting coil Tc. The current can be induced in the receiving coil Rc based on the magnetic field generated by the transmitting coil Tc. The battery device 2 can charge the battery by converting the current induced in the receiving coil Rc into a voltage suitable for the battery.

A wireless charging device 1 included in the above-mentioned wireless charging system 100 can provide a wide charging area and can simultaneously the plurality of battery devices 2. The wireless charging device is described in detail below.

Referring back to FIG. 1, the wireless charging device 1 includes a substrate 20 and a case 30. The two plate cores and a plurality of transmitting coils Tcs are provided on the substrate 20. The substrate 20 and the case 30 are coupled to each other to close an inside of the wireless charging device 1. A control circuit can be placed on the substrate 20 to apply a current to the plurality of transmitting coils Tcs based on the external power source. Examples of the circuit can include a printed circuit board (PCB), an integrated circuit (IC), and the like.

Among configurations of the wireless charging device 1, a structure of two plate cores and the plurality of transmitting coils Tcs placed on the substrate 20 is described below in detail. Meanwhile, a description of all coils other than the receiving coil Rc can be regarded as relating to the transmitting coil Tc.

Referring to FIG. 2, according to an embodiment of the present disclosure, the wireless charging device 1 can include plate cores and transmitting coils Tcs provided on the plate cores. The plate core can include a first plate core 10a and a second plate core 10b. The transmitting coil Tc can include a first layer coil to a fourth layer coil. In one embodiment, FIG. 2 shows the wireless charging device 1, and components of the wireless charging device 1 are not limited to examples shown in FIG. 2, and some components can be added, changed, or deleted as necessary or desired.

In order to explain structural features of the present disclosure, an x-axis direction is referred to as "a right-side direction" and a –x-axis direction is referred to as "a left-side direction" and a y-axis direction is referred to as "a forward direction" and a –y axis direction is referred to as "a rearward direction" and a z-axis direction is referred to as "an upward direction", and a –z-axis direction is referred to as "a downward direction".

The first plate core 10a and the second plate core 10b can include a component having high permeability and that is not easily broken. In some examples, the first plate core 10a and the second plate core 10b can be made of amorphous metal such as cobalt (Co), iron (Fe), nickel (Ni), boron (B), silicon (Si), or a combination thereof, and can have a sheet shape or a thin film shape. For example, according to the present disclosure, the first plate core 10a and the second plate core 10b can be a ferrite core.

Accordingly, the first plate core 10a and the second plate core 10b can increase magnetic flux density of the magnetic field generated by the transmitting coil Tc, and can efficiently define a magnetic path of the magnetic field.

The first plate core 10a and the second plate core 10b have the same size and shape and can be spaced apart from each other on the substrate 20. In some examples, as shown in FIG. 2, the first plate core 10a and the second plate core 10b can be spaced apart (e.g., separated) from each other by a predetermined distance in a planar direction (e.g., y-axis direction).

The transmitting coil Tc is a flat coil provided above the first plate core 10a and the second plate core 10b and can be wound clockwise or counterclockwise. Such coils can have a circular shape, an oval shape or a square shape. Connection terminals can be provided at both ends of transmitting coil Tc to electrically connect with the control circuit disposed on the substrate 20, and the control circuit can apply the current to each of transmitting coils Tcs to generate the magnetic field.

The transmitting coil Tc can be divided into the first layer coil to the fourth layer coil according to the arrangement thereof. In some examples, the first layer coil can refer to one or more coils disposed on the plate core to form a single layer, and the second layer coil can refer to one or more coils disposed on the first coil to form a single layer, and a third layer coil can refer to one or more coils disposed on the second layer coil to form a single layer, and a fourth layer coil can refer to one or more coils disposed on the third layer coil to form a single layer.

Referring to FIG. 3, the transmitting coil Tc included in the wireless charging device 1 can be elliptical shape having a vertical length of the transmitting coil Tc being greater than a horizontal length of the transmitting coil Tc. For example, a vertical outer radius (Roh) and a horizontal outer radius (Roy) of the transmitting coil Tc can be 24.5 mm and 22 mm, respectively, to form a charging area CA (described below with reference to FIG. 10) having a width of 10 m and a length of 4 cm, and the charging area is formed in the wireless charging device 1. A vertical inner radius (Riv) of the transmitting coil Tc and a horizontal inner radius (Rih) of the transmitting coil Tc can be 10.5 mm and 8.5 mm, respectively.

The transmitting coil Tc can be coupled to the receiving coil Rc with a predetermined coupling coefficient based on an amount of transmitted power, and the transmitting coil Tc can have predetermined inductance to have the coupling coefficient. The number of turns of the transmitting coil Tc is determined based on the inductance of the transmitting coil Tc. For example, according to the present disclosure, the transmitting coil Tc can be wound with the number of turns of about 12 to 15 so that the transmitting coil Tc has the inductance of 10.5 [uH] to 11.5 [uH].

Sizes and shapes of the transmitting coils Tcs included in the wireless charging device 1 can vary according to design needs. Sizes and shapes of the transmitting coils Tcs are assumed to be the same, but can vary from each other.

Referring back to FIG. 2, the first layer coil can include a 1-1 coil c1-1 and a 1-2 coil c1-2. The 1-1 coil c1-1 can be disposed on the first plate core 10a and the 1-2 coil c1-2 can be disposed on the second plate core 10b.

In some examples, some or all of the 1-1 coil c1-1 can be disposed on the first plate core 10a and can contact the first plate core 10a and some or all of the 1-2 coil c1-2 can be disposed on the second plate core 10b and can contact the second plate core 10b. For example, when viewed from the top of the wireless charging device 1, the 1-1 coil c1-1 can be included in the first plate core 10a and a portion of the 1-1 coil c1-1 can be included in the first plate core 10a.

The 1-1 coil c1-1 and the 1-2 coil c1-2 provided as described above can be spaced apart from each other on the same plane. In other words, the 1-1 coil c1-1 and the 1-2 coil c1-2 can be disposed on a single layer on which the first layer coil is disposed and can be horizontally spaced apart from each other.

In this case, a separation distance between the first plate core 10a and the second plate core 10b can be greater than a separation distance between the 1-1 coil c-1 and the 1-2 coil c1-2.

Referring to FIGS. 4 and 5, the first plate core 10a and the second plate core 10b can be horizontally spaced apart each other by a distance d. The 1-1 coil c1-1 can be disposed on the first plate core 10a, and a portion of the 1-1 coil c1-1 can protrude toward an outside of the first plate core 10a. The 1-2 coil c1-2 can be disposed on the second plate core 10b, and a portion of the 1-2 coil c1-2 can protrude toward an outside of the second plate core 10b.

At this time, the 1-1 coil c1-1 and 1-2 coil c1-2 can be horizontally spaced apart from each other by a distance of d1, and the separation distance d1 between the two coils c1-1 and c1-2 can be less than the separation distance d between the two plate cores 10a and 10b. For example, the separation distance d1 can be determined within a range being greater than 0 and less than d.

The second layer coil is disposed above the first layer coil and can include a 2-1 coil c2-1 partially overlapped with the 1-1 coil c1-1, a 2-2 coil c2-2 partially overlapped with the 1-1 coil c1-1 and the 1-2 coil c1-2, and a 2-3 coil c2-3 partially overlapped with the 1-2 coil c1-2.

In some examples, a portion of the 2-1 coil c2-1 can be disposed on the 1-1 coil c1-1 so that the 2-1 coil c2-1 is partially overlapped with the 1-1 coil c1-1 and a portion of the 2-2 coil c2-2 can be disposed on the 1-1 coil c1-1 and the 1-2 coil c1-2 so that the 2-2 coil c2-2 is partially overlapped with the 1-1 coil c1-1 and the 1-2 coil c1-2, and a portion of the 2-3 coil c2-3 can be disposed on the 1-2 coil c1-2 so that the 2-3 coil c2-3 is partially overlapped with the 1-2 coil c1-2.

The 2-1 coil c2-1 to the 2-3 coil c2-3 provided as described above can be placed on the same plane and can be spaced apart from one another. In other words, the 2-1 coil c2-1 to the 2-3 coil c2-3 can be horizontally spaced apart from one another in a single layer on which the second layer coil is disposed.

At this time, the separation distance between the 2-1 coil c2-1 and the 2-2 coil c2-2 can be identical to the separation distance between the 2-2 coil c2-2 and the 2-3 coil c2-3. In other words, the 2-1 coil c2-1 to the 2-3 coil c2-3 can be arranged on the same horizontal plane by equal distances.

Referring to FIG. 6, the second layer coil can be disposed above the first layer coil and can be a single layer and can be collinear. In other words, in the second layer coil, centers of the coils c2-1, c2-2, and c2-3 can be on the same horizontal line. In this case, the coils c2-1, c2-2, and c2-3 included in the second layer coil can be spaced apart from one another by a distance d2. The distance d2 can be the same as or different from the distance d1.

An insulating sheet IS can be provided on the first layer coil on a surface where the first layer coil and the second layer coil overlap with each other. In other words, an upper surface of the first layer coil can contact a lower surface of the insulating sheet IS and a lower surface of the second layer coil can contact an upper surface of the insulating sheet IS.

Referring back to FIG. 6, the insulating sheet IS can be provided on the first layer coil to insulate the first layer coil and the second layer coil. The insulating sheet IS can be provided over the entire first layer coil, or can be selectively provided in an area where the first layer coil and the second layer coil overlap with each other, as shown in the figures.

The insulating sheet IS can also be provided on a surface where the second layer coil is overlapped with the third layer coil described below and a surface where the third layer coil is overlapped with a fourth layer coil described below. That is, according to the present disclosure, the insulating sheets Iss can be provided on all surfaces where the plurality of coils are overlapped with one another, and the plurality of coils are disposed on respective layers.

As the transmitting coil Tc is basically insulated, insulation performance can be maintained even when any transmitting coil Tc contacts with another transmitting coil Tc. However, even when current leakage occurs due to external damage or the like of the transmitting coil Tc, an upper surface of one or a first transmitting coil of the plurality of transmitting coils Tcs can contact a lower surface of the insulating sheet IS and a lower surface of another or a second transmitting coil of the plurality of transmitting coils Tcs can contact an upper surface of the insulating sheet IS, thereby providing insulating between the transmitting coils Tcs.

The third layer coil is disposed above the second layer coil and can include a 3-1 coil c3-1 partially overlapped with the 2-1 c2-1 and the 2-2 coil 2-2, and a 3-2 coil c3-2 partially overlapped with the 2-2 coil c2-2 and the 2-3 coil c2-3.

In some examples, a portion of the 3-1 coil c3-1 can be disposed above the 2-1 coil c2-1 and the 2-2 coil c2-2 to partially overlap with the 2-1 coil c2-1 and the 2-2 coil c2-2 and a portion of the 3-2 coil c3-2 can be disposed on the 2-2 coil c2-2 and the 2-3 coil c2-3 to partially overlap with the 2-2 coil c2-2 and the 2-3 coil c2-3.

The 3-1 coil c3-1 and the 3-2 coil c3-2 disposed as described above can be placed on the same plane and can be spaced apart from each other. In other words, the 3-1 coil c3-1 and the 3-2 coil c3-2 can be disposed on a single layer on which the third layer coil is disposed and can be horizontally spaced apart from each other.

A fourth layer coil is disposed on the third layer coil, and can include a 4-1 coil c4-1 partially overlapped with the 3-1 coil c3-1 and a 4-2 coil c4-2 partially overlapped with the 3-1 coil c3-1 and the 3-2 coil c3-2. The separation distance between two adjacent coils in one or more of the first through fourth layer coils can the same or different from one or more other separation distance between two adjacent coils in the same or another layer coil. For example, the separation distances can be the same or different.

In some examples, a portion of the 4-1 coil c4-1 can be disposed on the 3-1 coil to partially overlap with the 3-1 coil c3-1 and a portion of the 4-2 coil c4-2 can be disposed on the 3-2 coil c3-2 to partially overlap with the 3-2 coil c3-2.

The 4-1 coil c4-1 and the 4-2 coil c4-2 disposed as described above can be placed on the same plane and can be spaced apart from each other. In other words, the 4-1 coil c4-1 and the 4-2 coil c4-2 can be disposed on the single layer on which the fourth layer coil is disposed and can be horizontally spaced apart from each other.

The plurality of coils to form respective layers can be disposed in areas formed by the first plate core 10a and the second plate core 10b.

An area formed by the first plate core 10a and the second plate core 10b can refer to a single minimum area including the first plate core 10a and the second plate core 10b viewed from the top of the wireless charging device 1.

Accordingly, as shown in FIG. 4, an area formed by the first plate core 10a and the second plate core 10b can refer to a rectangular area and the rectangular area can have a lateral length determined by adding a separation distance between two plate cores to a sum of lateral lengths of the two plate cores 10a and 10b and can have a vertical length being identical to a vertical length of each of the two plate cores 10a and 10b.

In this case, as shown in FIG. 4, a total of nine transmission coils Tcs included in the first layer coil to the fourth layer coil can be disposed in an area formed by the first plate core 10a and the second plate core 10b.

Accordingly, the first plate core 10a and the second plate core 10b can increase the magnetic flux density of the magnetic field generated by any one transmitting coil Tc, among the first layer coil to the fourth layer coil, and efficiently define a magnetic path of the magnetic field.

Referring back to FIG. 4, the first layer coil and the second layer coil can be disposed on a first horizontal line HL1, and the third layer coil and the fourth layer coil can be disposed on a second horizontal line HL2.

In some examples, centers of the 1-1 coil c1-1, the 1-2 coil c1-2, the 2-1 coil c2-1, and the 2-3 coil c2-3 can be disposed on the first horizontal line HL1 and centers of the 3-1 coil c3-1, the 3-2 coil c3-2, the 4-1 coil c4-1, and the 4-2 coil c4-2 can be disposed on the second horizontal line HL2 parallel to the first horizontal line HL1.

The first horizontal line HL1 and the second horizontal line HL2 can be spaced apart by a predetermined vertical distance dh. Accordingly, the first layer coil and the second layer coil disposed on the first horizontal line, and the third layer coil and the fourth layer coil disposed on the second horizontal line can be spaced apart from each other in a y-axis direction by the predetermined vertical distance dh.

The distance dh between the first horizontal line HL1 and the second horizontal line HL2 can be arbitrarily determined according to design needs. However, as described below in FIG. 10, the distance dh between the first horizontal line HL1 and the second horizontal line HL2 can be set as 30% to 45% of the vertical length of each of coils to form a charging area CA formed in the wireless charging device 1 having a width of 10 cm and a length of 4 cm.

For example, as described with reference to FIG. 3, in some cases, where the vertical outer radius Roh of each coil is 24.5 mm, the vertical length of each of the coils can be 49 mm. Here, 49 mm can be basically the length of the coil in the vertical direction. In this case, the distance dh between the first horizontal line HL1 and the second horizontal line HL2 can be set to 17.14 mm to 22.05 mm, which corresponds to 35% to 45% of 49 mm.

The first layer coil and the second layer coil can be symmetrical with respect to the center vertical line VL of each of the first plate core 10a and the second plate core 10b. The center vertical line VL of the first plate core 10a and the second plate core 10b is used to divide the two plate cores 10a and 10b, and can vertically cross a separation portion between the two plate cores 10a and 10b to divide the separation portion in half.

Referring back to FIG. 4, the center vertical line VL of each of the first plate core 10a and the second plate core 10b can be located between the two plate cores 10a and 10b. As the center vertical line VL is used to divide the two plate cores 10a and 10b, when the separation distance between the two plate cores 10a and 10b is d, a horizontal distance between the central vertical line VL and the first plate core 10a and a horizontal distance between the central vertical line VL and the second plate core 10b can be the same, for example, can correspond to distance d/2.

The 1-1 coil c1-1 and the 1-2 coil c1-2 can be symmetrically with respect to the center vertical line VL. In other words, the distance between the center of the 1-1 coil c1-1 and the center vertical line VL can be equal to the distance between the center of the 1-2 coil c1-2 and the center vertical line VL.

Further, the 2-1 coil c2-1 and the 2-3 coil c2-3 can be symmetrical to each other with respect to the center vertical line VL. The 2-2 coil c2-2 itself can be symmetrical with respect to the center vertical line VL. In other words, a distance between the center of the 2-1 coil c2-1 and the center vertical line VL can be identical to a distance between the center of the 2-3 coil c2-3 and the center vertical line VL. Meanwhile, the center of the 2-2 coil c2-2 can be disposed on the center vertical line VL, so that the 2-2 coil c2-2 itself is symmetrical with respect to the center vertical line VL.

The 3-1 coil c3-1 and the 4-2 coil c4-2 can be symmetrical to each other with respect to the center vertical line VL of the first plate core 10a and the second plate core 10b.

In some examples, the layer in which the 3-1 coil c3-1 is disposed can be different from the layer in which the 4-2 coil c4-2 is disposed. When viewed from the top of the wireless charging device 1, the 3-1 coil c3-1 and the 4-2 coil c4-2 can be disposed relative to each other so that the distance between the center vertical line VL and the center of the 3-1 coil c3-1 is identical to the distance between the central vertical line VL and the center of the 4-2 coil c4-2.

Further, the 3-2 coil c3-2 and the 4-1 coil c4-1 can be symmetrical to each other with respect to the center vertical line VL of each of the first plate core 10a and the second plate core 10b.

Similarly, the layer in which the 3-2 coil c3-2 is disposed can be different from the layer in which the 4-1 coil c4-1 is disposed. The 3-2 coil c3-2 and the 4-1 coil c4-1 can be disposed relative to each other so that a distance dy4 between the central vertical line VL and the center of the 3-2 coil c3-2 is identical to a distance dy4 between the center vertical line VL and a center of the 4-1 coil c4-1, when viewed from the top of the wireless charging device 1

In some cases, where the third layer coil and the fourth layer coil are disposed through the above-described method, the distance dy3 between the center of the 4-1 coil c4-1 and the center of the 3-1 coil c3-1, the distance dy3 between the center of the 3-1 coil c3-1 and the center of the 4-2 coil c4-2, and the distance dy3 between the center of the 4-2 coil c4-2 and the center of the 3-2 coil can all be the same.

As shown in FIG. 4, the fourth layer coil can overlap with the third layer coil. At this time, the centers of the 4-1 coil c4-1, the 3-1 coil c3-1, the 4-2 coil c4-2, and the 3-2 coil c3-2, arranged from the left side, can have equal distances dy3. In some examples, the third layer coil and the fourth layer coil are located on different layers from each other, but, viewed from the top of the wireless charging device 1, the third layer coil and the fourth layer coil, which are horizontally and sequentially disposed, can be disposed so that the distance dy3 between the center of the 4-1 coil c4-1 and the center of the 3-1 coil c3-1, the distance dy3 between the center of the 3-1 coil c3-1 and the center of the 4-2 coil c4-2 and the distance dy3 between the center of the 4-2 coil c4-2 and the center of the 3-2 coil c3-2 can be all the same.

The distance dy3 between the center of the 4-1 coil c4-1 and the center of the 3-1 coil c3-1, the distance dy3 between the center of the 3-1 coil c3-1 and the center of the 4-2 coil c4-2 and the distance dy3 between the center of the 4-2 coil c4-2 and the center of the 3-2 coil c3-2 can be arbitrarily determined according to design needs. However, as described below in FIG. 10, the distance dy3 between each coil of the fourth layer coil and each coil of the third layer coil can be set as 55% to 65% of the horizontal length of each of coils to provide a charging area CA having a width of 10 cm and a length of 4 cm, formed in the wireless charging device 1.

For example, as described with reference to FIG. 3, based on the horizontal outer radius Rov of each of coils being 22 mm, the horizontal length of each of the coils can be 44 mm. Here, 44 mm can be basically the length of the coil in the horizontal direction. At this time, the distance dy3 between the center of the 4-1 coil c4-1 and the center of the 3-1 coil c3-1, the distance dy3 between the center of the 3-1 coil c3-1 and the center of the 4-2 coil c4-2 and the distance dy3 between the center of the 4-2 coil c4-2 and the center of the 3-2 coil c3-2 can be set to 24.2 mm to 28.6 mm, which corresponds to 55% to 65% of 44 mm.

As the first layer coil to the fourth layer coil are disposed on different layers from each other, heights of the first layer coil to the fourth layer coil, above the first plate core 10a and the second plate core 10b, can be different from one another. In this case, deviation of the inductance for each coil looking into the receiving coil Rc may be increased, and the deviation between the magnetic flux densities of the magnetic fields generated by coils may be increased, thereby reducing the power transmission efficiency.

In order to prevent or address the above issue, a plurality of height compensating cores can be disposed on the first plate core 10a and the second plate core 10b to compensate for height differences between the first layer coil and the second layer coil, the second layer coil and the third layer coil, and the third layer coil and the fourth layer coil.

Referring back to FIG. 2, the plurality of height compensating cores can be disposed above the first plate core 10a and the second plate core 10b to compensate for a high difference between the first layer coil and the second layer coil, a height difference between the second layer coil and the third layer coil, and a height difference between the third layer coil and the fourth layer coil.

In more detail, with reference to FIGS. 2 and 7 to 9, the plurality of height compensating cores can include a first height compensating core 11a, a second height compensating core 11b, and a third height compensating core 11c, and the first height compensating core 11a compensates for the height difference between the first layer coil and the second layer coil and the second height compensating core 11b compensates for the height difference between the second layer coil and the third layer coil, and the third height compensating coil 11c compensates for the height difference between the third layer coil and the fourth layer coil.

The first height compensating core 11a can be disposed on the first plate core 10a and the second plate core 10b and can be disposed at both sides of the first layer coil and can have the same height as the first layer coil, to compensate for the height difference between the first layer coil and the second layer coil.

Each of areas of the first plate core 10a and the second plate core 10b can be greater than the area of each of the 1-1 coil c1-1 and the 1-2 coil c1-2, and the first height compensating core 11a can be disposed at both sides of the 1-1 coil c1-1 and the 1-2 coil c1-2 (along the x-axis direction) and can have the same height as the first layer coil.

In some examples, the first height compensating core 11a can be disposed on the first plate core 10a in the −x axis direction with respect to the 1-1 coil c1-1. Further, the first height compensating core 11a can be disposed on the second plate core 10b in the +x-axis direction with respect to the 1-2 coil c1-2. Accordingly, a portion of the 2-1 coil c2-1 and a portion of the 2-3 coil c2-3 can be disposed on the first height compensating core 11a.

The second height compensating core 11b can be disposed at a front end or a rear end of the second layer coil and can have the same height of the second layer coil to compensate for the height difference between the second layer coil and the third layer coil. For example, the second height compensating core 11b can be disposed at the front end of the 2-1 to 2-3 coils c2-1 to c2-3 (in the +y direction) and can have the same height as the second layer coil.

In some examples, the second height compensating core 11b can be disposed above the first plate core 10a and the first height compensating core 11a in the +y-axis direction with respect to the 2-1 coil c2-1. Further, the second height compensating core 11b can be disposed above the second plate core 10b and the first height compensating core 11a along the +y-axis direction with respect to the 2-3 coil c2-3. Accordingly, a portion of each of the 3-1 coil c3-1 and the 3-2 coil c3-2 can be disposed on the second height compensating core 11b.

The third height compensating core 11c can be disposed at one end of the third layer coil to have the same height as the third layer coil, to compensate for the height difference between the third layer coil and the fourth layer coil.

In some examples, the third height compensating core 11c can be disposed at one side of the 3-1 coil c3-1 (along the −x-axis direction) and can have the same height as the third layer coil. Accordingly, a portion of the 4-1 coil c4-1 can be disposed on the third height compensating core 11c.

As the height compensating cores are provided between the first layer coil to the fourth layer coil to compensate for the height differences between the coils disposed in respective layers, each coil can have an equivalent level of inductance regardless of the position of the coil. As a variation, the height compensation cores can be integrally formed with the first and/or second plate cores 10a and 10b.

The power transmission efficiency in the charging area CA formed in the wireless charging device 1 is described below with reference to FIG. 10.

Referring to FIG. 10, as the wireless charging device 1 has the above-described structure, a rectangular charging area CA having a width of 10 cm and a length of 4 cm can be formed on the wireless charging device.

Based on a result of the measurement of the power transmission efficiency, in one example, the power transmission efficiency was 40% or more in the entire charging area CA, and in particular, the power transmission efficiency of about 70% is measured in the portion where the coils are provided.

In some cases, where the battery device 2 is disposed above the first plate core 10a of the wireless charging device 1, the wireless charging device 1 can apply the current to any one transmitting coil Tc adjacent to the battery device 2, among coils (e.g., the 1-1 coil, the 2-1 coil, the 2-2 coil, the 3-1 coil, and the 4-1 coil) disposed above the first plate core 10a and can supply the power to the battery device 2. By contrast, in some cases, where the battery device 2 is located above the second plate core 10b, the wireless charging device 1 can apply the current to any one transmitting coil adjacent to the battery device 2, among coils (e.g., the 1-2 coil, the 2-2 coil, the 2-3 coil, the 3-2 coil, and the 4-2 coil) disposed above the second plate core 10b and can supply the power to the battery device 2.

Further, in some cases, where the two battery devices 2 are located above the first plate core 10a and the second plate core 10b, respectively, the wireless charging device 1 can simultaneously apply the current to a portion of coils disposed above the first plate core 10a and a portion of coils disposed above the second plate core 10b to supply the power.

According to the present disclosure, the magnetic field generated by one core can be prevented from being interfering with the other core by overlapping multiple coils on separated cores, and wireless power transmission using the electromagnetic induction phenomenon can be performed over a wide range.

Further, according to the present disclosure, the wide charging area can be provided to charge the battery device, so that the battery device is charged without precisely positioning the battery device above the wireless charging device, thereby improving user convenience.

Further, according to the present disclosure, the multi-wireless charging with respect to the plurality of battery devices is performed, so that a single user can charge a plurality of battery devices at the same time, or a plurality of users can charge their own battery devices at the same time, thereby improving the use efficiency.

Various substitutions, modifications, and changes can be made within the scope that does not deviate from the technical idea of the present disclosure for the skilled person in the art to which the present disclosure pertains, the above-mentioned disclosure is not limited to the above-mentioned embodiment and the accompanying drawings.

Other embodiments are within the scope of the following claims.

What is claimed is:

1. A wireless charging device, comprising:
    a first plate core and a second plate core spaced apart from each other and disposed to be symmetrical with respect to a center vertical line;
    a first layer coil comprising a 1-1 coil disposed on the first plate core and a 1-2 coil disposed on the second plate core;
    a second layer coil disposed above the first layer coil, the second layer coil comprising a 2-1 coil partially overlapped with the 1-1 coil, a 2-2 coil partially overlapped with at least one of the 1-1 coil and the 1-2 coil and overlapped with the first plate core and the second plate core, and a 2-3 coil partially overlapped with the 1-2 coil;
    a third layer coil disposed above the second layer coil, the third layer coil comprising a 3-1 coil partially overlapped with at least one of the 2-1 coil and the 2-2 coil, and a 3-2 coil partially overlapped with at least one of the 2-2 coil and the 2-3 coil; and
    a fourth layer coil disposed above the third layer coil and comprising a 4-1 coil partially overlapped with the 3-1 coil, and a 4-2 coil partially overlapped with at least one of the 3-1 coil and the 3-2 coil.

2. The wireless charging device of claim 1, wherein the plurality of coils in at least one of the first, second, third and fourth layer coils are placed on a same plane and spaced apart from one another.

3. The wireless charging device of claim 1, wherein a separation distance between the 2-1 coil and the 2-2 coil is the same as a separation distance between the 2-2 coil and the 2-3 coil.

4. The wireless charging device of claim 1, wherein some of the coils in the second, third and fourth layer coils are disposed above a separation area formed between the first plate core and the second plate core.

5. The wireless charging device of claim 1,
    wherein the first layer coil and the second layer coil are disposed on a first horizontal line, and
    wherein the third layer coil and the fourth layer coil are disposed on a second horizontal line different from the first horizontal line.

6. The wireless charging device of claim 5, wherein a distance between the first horizontal line and the second horizontal line corresponds to approximately 35% to 45% of a vertical length of one of the coils in one of the first to fourth layer coils.

7. The wireless charging device of claim 1, wherein a separation distance between the first plate core and the second plate core is greater than a separation distance between the 1-1 coil and the 1-2 coil.

8. The wireless charging device of claim 1, wherein each of the first layer coil and the second layer coil is disposed symmetrically with respect to the center vertical line between the first plate core and the second plate core.

9. The wireless charging device of claim 1, wherein the 3-1 coil and the 4-2 coil are disposed symmetrical to each other with respect to the center vertical line between the first plate core and the second plate core.

10. The wireless charging device of claim 1, wherein the 3-2 coil and the 4-1 coil are disposed symmetrical to each other with respect to the center vertical line between the first plate core and the second plate core.

11. The wireless charging device of claim 1, wherein a distance between a center of the 4-1 coil and a center of the 3-1 coil, a distance between a center of the 3-1 coil and a center of the 4-2 coil, and a distance between a center of the 4-2 coil and a center of the 3-2 coil are substantially the same.

12. The wireless charging device of claim 1, wherein a distance between the center of the 4-1 coil and the center of the 3-1 coil, a distance between the center of the 3-1 coil and the center of the 4-2 coil, and a distance between the center of the 4-2 coil and the center of the 3-2 coil corresponds to approximately 55% to 65% of a horizontal length of one of the coils in one of the first to fourth layer coils.

13. The wireless charging device of claim 1, further comprising:
    a plurality of height compensating cores disposed above the first plate core and the second plate core to compensate for height differences between the first layer coil and the second layer coil, the second layer coil and the third layer coil, and the third layer coil and the fourth layer coil.

14. The wireless charging device of claim 13, wherein the plurality of height compensating cores comprise at least two of the following:
    a first height compensating core disposed on the first plate core and the second plate core, disposed at both sides of the first layer coil, and having the same height as the first layer coil to compensate for a height difference between the first layer coil and the second coil layer;
    a second height compensating core disposed at a front end or a rear end of the second layer coil, and having the same height as the second layer coil to compensate for a height difference between the second layer coil and the third layer coil; and
    a third height compensating core disposed at one side of the third layer coil, and having the same height as the third layer coil to compensate for a height difference between the third layer coil and the fourth layer coil.

15. The wireless charging device of claim 1, further comprising:
    an insulating sheet provided on a surface where a coil in one of the first to fourth layer coils overlaps a coil in another of the first to fourth layer coils.

16. A wireless charging device, comprising:
    a first plate core and a second plate core spaced apart from each other and disposed to be symmetrical with respect to a center vertical line; and
    a plurality of coil layers stacked above the first and second plate cores,
    wherein each of the plurality of coil layers includes a plurality of coils that are separated from each other,
    wherein at least one of the plurality coils in each of the plurality of coil layers overlaps or is overlapped by at least one of the plurality of coils in another one of the plurality of coil layers, and wherein at least one coil in one of the plurality of coil layers is disposed to be overlapped with the first plate core and the second plate core.

17. The wireless charging device of claim 16, wherein in each of the plurality of coil layers, the plurality of coils are on a same plane, and wherein a separation distance between the first and second plate cores is greater than a separation distance between two coils in one of the plurality of coil layers.

18. The wireless charging device of claim 16, wherein centers of two of the plurality of coil layers are aligned to each other on a first horizontal line, and wherein centers of different two of the plurality of coil layers are aligned to each other on a second horizontal line different from the first horizontal line.

19. The wireless charging device of claim 16, further comprising:

a plurality of height compensating cores disposed above the first plate core and the second plate core to compensate for height differences associated with the plurality of coil layers.

20. The wireless charging device of claim 16, further comprising:

an insulating sheet provided on a surface where a coil in one of the plurality of coil layers overlaps a coil in another of the plurality of coil layers.

* * * * *